United States Patent [19]
Kirkbride

[11] Patent Number: 5,429,783
[45] Date of Patent: Jul. 4, 1995

[54] MAKING FIBERBALLS

[75] Inventor: James F. Kirkbride, Wilmington, Del.

[73] Assignee: E. I. du Pont de Nemours and Company, Wilmington, Del.

[21] Appl. No.: 229,893

[22] Filed: Apr. 19, 1994

[51] Int. Cl.⁶ .................. B29B 9/00; B29C 67/00
[52] U.S. Cl. ........................... 264/117; 264/122
[58] Field of Search ..................... 264/117, 122

[56] References Cited

U.S. PATENT DOCUMENTS

| | | | |
|---|---|---|---|
| 4,618,531 | 10/1986 | Marcus | 428/283 |
| 4,747,550 | 5/1988 | Jäckering | 241/55 |
| 4,783,364 | 11/1988 | Marcus | 428/288 |
| 4,794,038 | 12/1988 | Marcus | 428/288 |
| 4,818,559 | 4/1989 | Hama et al. | 427/2 |
| 4,818,599 | 4/1989 | Marcus | 428/288 |
| 4,940,502 | 7/1990 | Marcus | 156/272.2 |
| 4,957,794 | 9/1990 | Bair | 428/74 |
| 5,112,684 | 5/1992 | Halm et al. | 428/357 |
| 5,169,580 | 12/1992 | Marcus | 264/115 |
| 5,218,740 | 6/1993 | Snyder et al. | 19/66 R |
| 5,238,612 | 8/1993 | Halm et al. | 264/15 |
| 5,338,500 | 8/1994 | Halm | 264/122 |
| 5,344,707 | 9/1994 | Snyder | 428/359 |

FOREIGN PATENT DOCUMENTS 203469 12/1986 European Pat. Off. .

OTHER PUBLICATIONS 8 page brochure entitled "ULTRA-ROTOR", by Altenburger Maschinen-Jäckering GmbH and Co. KG.
4 page brochure entitled "ULTRA-ROTOR", by Altenburger Maschinen(part of group Jäckering).
8 page brochure entitled "ULTRA-ROTOR III A", by Altenburger Maschinen La70679/87/2).

Primary Examiner—Mary Lynn Theisen

[57] ABSTRACT

Fiberfilling material is converted into fiberballs by an air-assisted rolling process in a turbulent air mill. Such a continuous process shows significant advantages over prior suggestions, with regard to productivity and flexibility.

7 Claims, 2 Drawing Sheets

MAKING FIBERBALLS

FIELD OF INVENTION

This invention concerns improvements in and relating to making fiberballs, and more particularly to a novel process for making fiberballs from synthetic feed fiber in the form of synthetic staple fiber, such as cut polyester fiber for use as fiberfill and for making bonded articles, e.g. by molding, and to the resulting products and to apparatus aspects.

BACKGROUND OF THE INVENTION

Polyester fiberfill (sometimes referred to as fiberfilling material) is used commercially as filling material for many stuffed articles, including pillows and other home furnishings and bedding articles, such as comforters, quilts and sleeping bags, and also in, for example, filled apparel, such as anoraks.

Marcus disclosed in U.S. Pat. Nos. 4,618,531 and 4,783,364 and in EP 203,469 using such polyester filling material randomly entangled together in the form of refluffable fiberballs, and Marcus disclosed therein an air-tumbling process for making such fiberballs from feed fiber of spiral crimp (more correctly perhaps termed helical configuration) such as can be made by air-jet quenching or by spinning fibers from bicomponent polymer systems. Such an air-tumbling process as Marcus described has given excellent results, but has limitations, for instance in the type of feed fiber that should be used and in productivity, being a comparatively slow batch process and involving use of a revolving drum whose capacity has been a limiting factor. Other processes that have been used and developed have involved modifying carding machines (cards) to produce lofty randomly-entangled fiberballs instead of parallelized (carded) webs. Snyder et al in U.S. Pat. No. 5,218,740, disclosed examples of such modified cards, that may include modified roller-type cards, modified flat top cards and other modified types of cards, and how to process feed fiber that may have spiral crimp, or have been mechanically crimped as disclosed for example in Halm et al. U.S. Pat. Nos. 5,112,684, 5,238,512 and allowed application Ser. No. 08/073,294 now U.S. Pat. No. 5,338,500. Such processes overcome some of the limitations of Marcus' air-tumbling process, but it has still been desirable to improve productivity.

In addition to refluffable fiberballs (variously called by other terms, commercially, such as "clusters" and "puffs" for example), Marcus also described making randomly-entangled fiberballs including also binder fiber and processes that used such fiberballs as intermediates for making molded products, such as cushions and mattress cores, for examples, in U.S. Pat. Nos. 4,794,038, 4,940,502, 5,169,580, and allowed application Ser. No. 08/010,215 now U.S. Pat. No. 5,344,707. For simplicity, when considering fiberballs made from blends including binder fiber, the other fiber (other than the binder fiber) is sometimes termed the "load-bearing fiber" in contrast to the binder material. In practice, preferred binder fibers are often bicomponent fibers, only part of which is binder material that melts or softens, while the remainder becomes load-bearing after activation of the binder material. Snyder et al and Halm et al also disclosed like fiberballs, processes and molded products in their aforementioned patents.

All of the patents mentioned above are incorporated herein by reference.

A problem that has been solved by the present invention is how to make fiberballs for filling purposes and as intermediates for making molded products at greater productivity than has been suggested in the art.

OTHER PRIOR ART

Bair disclosed in U.S. Pat. No. 4,957,794 a "fluff" of aramid fibers, which he identified as an aramid fiber product which has a density of less than 0.08 g/cc and contains at least one fluff ball per milligram of fluff. Bair obtained his aramid "fluff" by subjecting aramid cut staple to the action of a turbulent air grinding mill, in particular a Model III Ultra-Rotor mill, as sold by Jäckering GmbH. Bair believed his aramid fibers were struck by blades of the grinding machine and crimped at the points of contact; after being struck several times and crimped at random angles around the fiber axis, his aramid fibers began to form into three dimensional bodies which entangled readily with adjacent crimped fibers. The presence of fluff balls aided in pneumatic conveying of his fluff and assured a majority of his aramid fibers had an out-of-plane crimp. Bair preferred "highly balled fluff" for resiliency applications, such as fire-resistant cushioning uses, and fluff at near minimum density for insulation and absorption uses.

Bair mentioned U.S. Pat. No. 4,747,550 (Jäckering) as giving a detailed description of a similar mill to Jäckering's Model III Ultra-Rotor mill. A modified Jäckering Model III A Ultra-Rotor mill (modified to avoid grinding) was used in the Examples herein to make fiberballs according to the process of my invention, as described hereinafter. So Jäckering's U.S. Pat. No. 4,747,550 is incorporated herein by reference. Reference is also made herein to two brochures entitled "ULTRA-ROTOR" and another entitled "ULTRA-ROTOR. III A" provided by Altenburger Maschinen-Jäckering GmbH and Co. KG, D-4700 Hamm 1, P.O. Box 1733, Vorsterhauerweg 46, Germany, Tele+49-2381 4220, fax+49-2381 422136, Telex 828845.

SUMMARY OF THE INVENTION

According to the present invention, a process is provided for converting cut fiber of synthetic polyester or like synthetic melt-spun polymer, of cut length 12 to 80 ram, of 2 to 20 denier (or dtex in similar range of 2 to 22), and having a 3-dimensional "crimped" or like configuration, into fiberballs of randomly-entangled fibers, comprising feeding said cut fiber into a turbulent air mill that includes a cylindrical stator having an inner wall and cooperating with a rotor, rotatable relative to the stator and having a plurality of working plates that have their working surfaces facing the inner wall of the stator, and a gas transport facility having a central input port and a radially-located output port for gas and fiber, wherein the clearance between the working surfaces of the working plates and the inner wall of the stator is 4 to 10 mm.

Preferred process features, such as feeding blends of cut fibers into the mill, and features of the resulting products and apparatus according to the invention will be apparent as described herein.

DETAILED DESCRIPTION OF THE PREFERRED EMBODIMENTS

Figure 1:
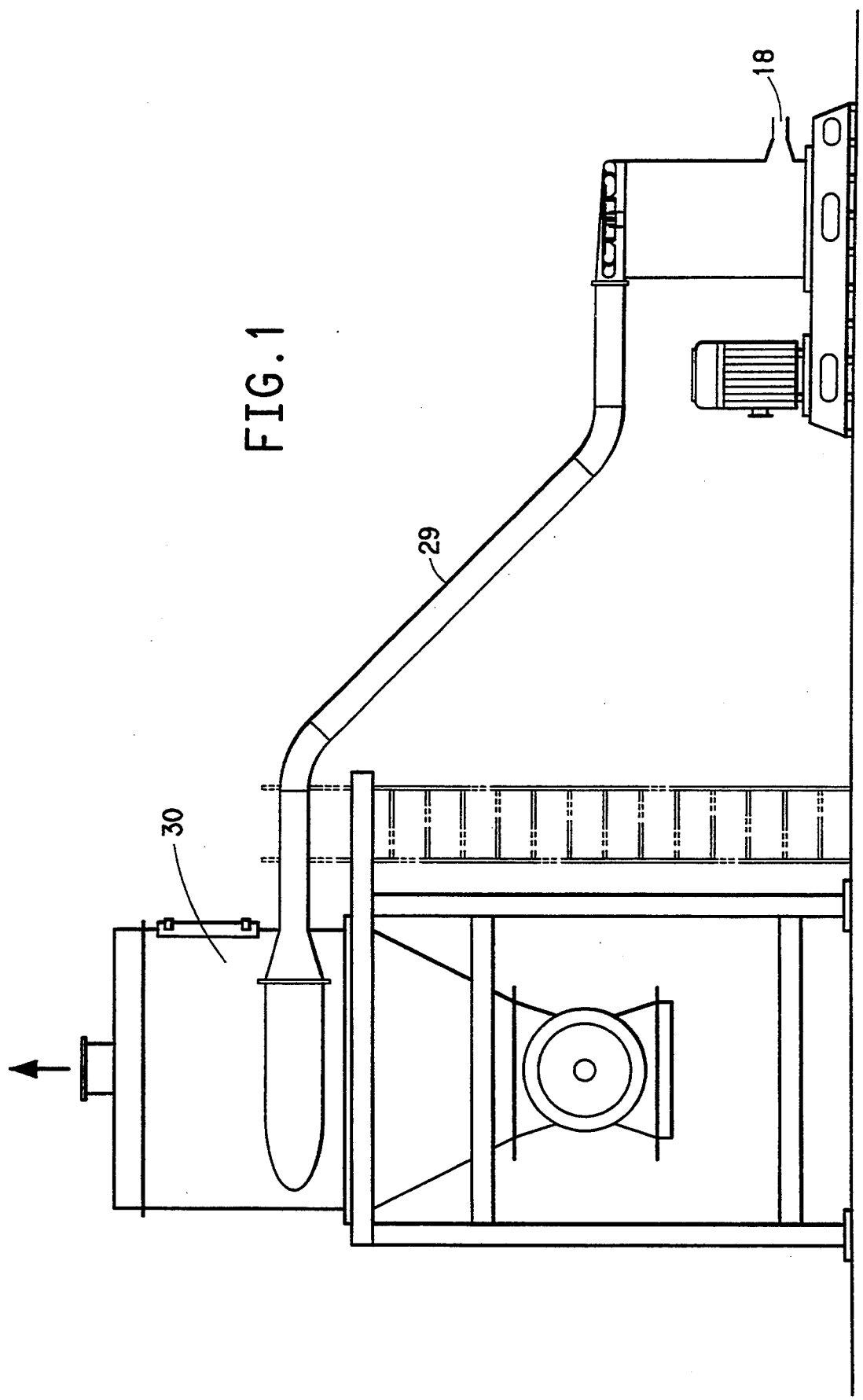
FIG. 1 is a representative schematic elevational view, partly in section, of a preferred apparatus including a turbulent air mill for performing the process of the invention.

Synthetic polyester is the preferred synthetic melt-spun polymer for feed fiber for conversion into fiberballs according to the present invention, as disclosed by Marcus, Snyder et al. or Halm et al. in the above-mentioned patents. A 3-dimensional helical configuration referred to as "spiral crimp", as disclosed therein, is preferred. Mechanically-crimped fibers may also be used, provided there is sufficient 3-dimensionality, for example sufficient secondary crimp, as disclosed therein. Bicomponent fibers generally provide an excellent 3-dimensional configuration. Bicomponent fibers generally consist of more than one type of synthetic polymer. Although polyester fibers, especially of poly(ethylene terephthate), have generally been preferred for use as fiberfill and will be generally referred to hereinafter, it will be understood that fibers of other synthetic melt-spun polymers may be used as load-bearing fibers instead or in addition. Binder fibers are referred to separately, hereinafter, and also may not be of polyester. Aramid fibers have unusual properties, such as unusually high strength and toughness, and are not melt-spun, of course, and are excluded from the present invention for use as the main load-bearing fibers; the presence of minor mounts of aramids, however, may be advantageous, to improve flame-resistance as suggested by Cooper et al in U.S. Pat. Nos. 4,040,371 and 4,199,642.

For many end-uses slickened fiberfill is preferred, as disclosed for example by Marcus, Snyder et al., and Halm et al., in the above-mentioned patents and in the patents referred to therein; slickening facilitates fiberball formation. Dry fiber (that has not been coated with a slickener) can be fed into the mill and processed however. Hollow fiberfill is also preferred for many end-uses, but fibers of any cross-section (solid or hollow) can be processed.

As indicated, the (load-bearing) fibers should be of cut length 12 to 80 mm, preferably 25 (or even 32) to 50 mm, generally depending on denier, which should be 2 to 20, generally preferably 3 to 13. It will be understood that in the metric system dtex and denier are practically equivalent (1dtex=0.9 denier) so similar ranges in dtex (2 to 22, and preferably 3 to 15) are approximately equivalent. The length of the cut fibers is measured as extended length, but the actual fiber length is shorter because of the crimped configuration, and in the fiberballs the fibers are randomly entangled.

I have fed the feed fibers into and rolled them in a mill that has a cylindrical stator 1 that cooperates with a plurality of working plates 7 that have a working surface facing the inner wall of the stator and are rotated relative to the stator by a rotor 2, and a gas transport facility having a central input port 16 and a radially-located output port 25 for gas and fiber, essentially as disclosed and illustrated in the Drawings of above-mentioned Jäckering U.S. Pat. No. 4,747,550, and the 2 brochures entitled "ULTRA-ROTOR" and the brochure entitled "ULTRA-ROTOR III A" (La70679/87/2), provided by Altenburger Maschinen, except as modified as disclosed herein.

First, unlike what is described (and entitled) by Jäckering, and unlike what is described by Bair, I do not operate my mill to grind fiber, but, instead, I have increased the clearances between the stator 1 and the plates 7. It is not my intention to operate so as to crimp the fiber, but I have used fiber of appropriate "crimped" configuration as feed, as taught by Marcus, Snyder et al, and/or Halm et al, as disclosed hereinbefore, and I have formed fiberballs by an air-assisted rolling process more or less on the same principles as disclosed by Marcus, but with much higher throughput in a continuous 1-pass process, in distinction to Marcus' batch process. Jäckering's U.S. patent shows five milling sections 5, and states that each section consists of a multitude (e.g. around 50) of milling plates 7. The brochures show four milling sections and indicate (without specifying any number) that perhaps as many as twenty-four plates may be arranged around each milling section. The whole emphasis in the brochures is on grinding (to a few microns) and one brochure starts with a heading "MICRONISATION". My objective is different. I increase the clearance between the (working surfaces of the) plates and the (inner wall of the) cylindrical stator to at least 4 mm, and prefer to space the plates, using, for example, only 12 instead of 24 in each section, but prefer to use more working sections, such as 7 sections used in the Examples. Thus it will be clear that my operation of the mill is quite different from that disclosed by Jäckering (to grind particles) or by Bair (to crimp aramid fibers at random angles and to create therefrom an aramid fluff of density less than 0.08 g/cc containing at least one fluff ball per milligram of fluff, to aid in pneumatic conveying of the mass and assure a majority of the fibers have an out-of-plane crimp).

Jäackering's patent (and brochure) shows sifter fingers 22 (FIGS. 1, 3, 4 and 5) and mentions them (col. 2, lines 54-55, col. 3, lines 8-9, 12-14, and the paragraphs from col. 3, line 49 to col. 4, line 27). A brochure mentions "the built-in-sifter". In contrast, to convert fiberfill into fiberballs, I have removed the sifter from the Ultra-Rotor Model III A mill. Sifter fingers may have advantages in a grinding process, in that the sifter fingers return oversized particles so they are fed back through the grinding cycle, whereas I have found that they are not generally desirable for fiberball manufacture in that they tend to break up the fiberball structure. It is understandable also that sifter fingers would not have created a problem for Bair, who primarily wanted a fluff with randomly-crimped aramid fiber.

Jäackering's patent does not show a cyclone separator to separate his resulting micronized particles from his gas stream transporting them, but one (of relatively narrow diameter) is shown in two brochures with the gas stream (carrying the particles) being fed into the top of the separator, and, of course, with a blower to pull the air stream (and particles) up from and out of the grinding mill. In contrast, I prefer (for fiberball manufacture) to use a specially constructed filter cyclone separator of somewhat larger diameter and to introduce the air stream below its top. I also preferred to operate with some back pressure (positive pressure).

Figure 2:
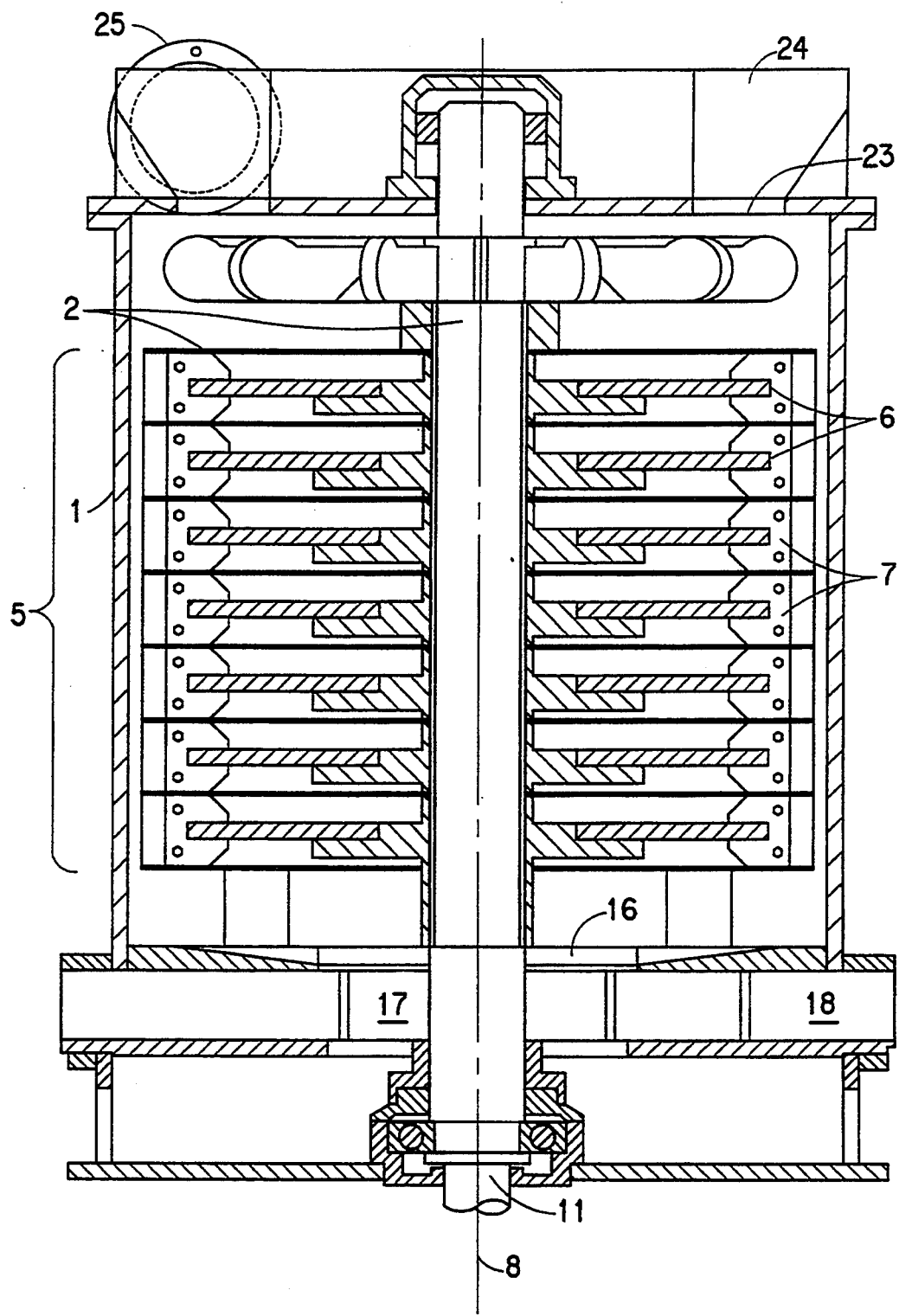
FIG. 2 an enlarged elevational view, partly in section, of the mill shown in FIG. 1.

Referring now to the accompanying drawings, I shall describe a preferred apparatus for performing the process of the invention as follows. For simplicity, my description will use the same reference numerals as Jäckering in U.S. Pat. No. 4,707,550 in describing a preferred turbulent air mill, illustrated in the Figures of Jäackering's patent (but referred to by Jäckering as a grinding mill), and, primarily, in FIG. 2 herein, and in FIG. 1 herein which shows a cyclone separator on the left side as well as the mill on the right side, and I shall not repeat here all the description by Jäckering.

The mill comprises a stator or stator housing 1 and a rotor indicated generally as 2 with a rotational axis 8. Feed fiber is metered into an air stream and sucked by the air stream into a feed port 18 and then into an axially-located space 17 near the base of the mill below milling sections 5 and through axially-located input port 16 into the bottom interior of the mill, directly beneath the first (lowest) milling section 5.

The mill is equipped with several vertically-superpositioned milling sections 5. Seven such milling sections 5 are shown and were generally used herein in the Examples according to my invention. Each milling section 5 consists of a plurality of milling plates 7 that are mounted on the outer periphery of a circular disc 6, the discs being mounted on a rotor shaft 11. The milling plates 7 extend radially and axially with respect to the rotational axis 8 of the rotor 2. Contrary to Jäackering's teaching (directed to grinding and pulverizing materials) I prefer to use a relatively small number of plates 7, 12 being preferred and set at 30 degree angles around the periphery of rotor 2. My operation of the airmill causes the fiberfill to be rolled on the inner wall of the stator 1 by the rotational action of the milling plates 7, because I modified the mill to provide sufficient clearance between the inner wall of the stator 1 and milling plates 7 for this to occur. As can be seen hereinafter, I used clearances between 4 and 10 mm with a modified Model III A Ultra-Rotor mill. Bair mentions using a filled (i.e. corrugated) wall surface on the inside of the stator. I used both a smooth surface and ones with corrugations (3 mm deep and 3 mm between peaks), my clearances being measured from the peaks.

Jäackering mentions the importance of using a sifter with sifter fingers (22 in his FIGS. 1, 3, 6 and 7) with a separate drive and speed control (his FIG. 3) to help control his grain size and adjust his pulverization procedure by recirculating his particles back into his mill. I found the sifter fingers disadvantageous, as already mentioned, so I modified the Ultra-Rotor Model III A mill by removing them, and I do not show a sifter or fingers in my Figures. Bair provided no drawing of his Ultra-Rotor Model III, presumably because it is available commercially, and Bair referred only to Jäackering's patent. Bair did not mention removing the sifter. Bair did discuss the advantage of recycling and did recycle his aramid fibers up to 9 times in his Examples 1 and 5, so it is clear that Bair favored recycling to increase the grinding action on his aramid fibers.

At the top of the air mill is a ring-shaped opening 23 for the gas and fiber feeding to an essentially ring-shaped channel 24 and a radially-located output port 25 leading to a filter cyclone separator 30 via a rising conduit 29. Contrary to normal construction and what is shown in the Jäackering brochures, I prefer to use a specially-constructed filter cyclone separator with a wider diameter cylindrical portion, as shown, and to feed conduit 29 into filter cyclone separator 30 well below its top, preferably at or near the base of its cylindrical portion, to accomodate the lofty fiberballs. Jäackering made a specially-constructed filter cyclone separator of 2 meters in diameter (about 6.5 meters height) with conduit 29 feeding in below filter sleeves (of length 1.5 meters) spaced about 300 mm apart. Jäackering's separator is followed by a blower to provide a vacuum (negative pressure) with a shut-off valve that enables one to operate at positive/negative pressures of up to 400 mm of water either way.

Any test methods are essentially as described by Marcus, Snyder et al. and Halm et al. in the aforementioned patents, incorporated by reference.

A series of experiments were made, using a modified Ultra-Rotor Model III A mill, with 7 milling sections (zones) each having 12 plates, as described and illustrated herein. I also operated successfully using only 4 milling sections.

I found that a clearance of 4 mm between the working surfaces of the working plates and the inner wall of the stator gave excellent lofty fiberballs at production rates of up to 2400 pounds of fiberballs per hour, after suitable adjustments of various items and conditions, such as the pressure as will be described, and using blades as shown in the "ULTRA-ROTOR III A" brochure and on the back of the 8-page "ULTRA-ROTOR" brochure. The other blades shown in the top two rows on the back page of the 4 page "ULTRA-ROTOR" brochure were not so effective, so are not preferred. I contemplate making further adjustments and optimizing items such as blade design. In contrast, when the clearance was reduced to 3 mm, satisfactory fiberballs were not made, but sometimes the fibers were ground to a powder and other times dense "nubs" were made. I contemplate, however, according to my present invention, optimizing conditions so as to make nubs and slubs as a modification, instead of fiberballs. I made satisfactory fiberballs also using a clearance of 7 mm, but, under the conditions I used, the 7 mm clearance was not so good as the 4 mm clearance that I used. I believe that larger clearances, e.g. up to about 10 mm, may also prove useful, especially under certain circumstances, such as using higher dpf feed fiber and/or higher loadings of feed fiber (to give higher productivity). I used both positive and negative pressures of up to 400 mm (water), but preferred to use a positive (i.e. a back) pressure of 200–400 mm (water), which forces the fiberballs to stay longer in the apparatus. I used both a corrugated and a smooth inner surface for the stator with satisfactory results. I processed dry and slickened fiber, dpfs being from 4 to 12 dpf, and blends of both 4 and 12 dpf fiber.

As indicated hereinbefore and in the art, a particularly useful type of fiberball has been made from a blend of fiberfill (of relatively higher softening and melting point) and a binder fiber. Such binder fiber may be a monocomponent fiber wholly comprised of binder material of relatively low softening point, so that it is susceptible to soften and/or melt and bond, i.e., act as a binder for the higher melting load-bearing fibers upon subjecting to suitable heating and followed by cooling, e.g. during molding. Suitable binder material desirably melts or softens at a temperature at least 5° C. lower than the temperature at which the load-bearing fibers soften, and preferably significantly lower. Preferred binder fibers are bicomponent, one component comprising such binder material to perform the above-mentioned bonding function, while another component is resistant to softening or melting under the same conditions. Suitable examples of such binder fibers are given in the Marcus and Snyder et al. and Halm et al. patents listed above and in Marcus U.S. Pat. No. 4,818,599, and in the references mentioned in such patents. Particularly preferred binder fibers are those comprising crystalline binder material having a sharply-defined melting point within a useful temperature range, especially those derived from copolymers of ethylene terephthalate polymers including glutarate and diethylene glycol residues such as are disclosed in EPA2 0 372 572, published Jun. 13, 1990. Binder fiber generally has little or no crimp. This will not prevent the making of fiberballs, provided there is sufficient crimped load-bearing fiber in the blend.

When blends of fibers including binder material (that is susceptible to softening or even melting when heated) are processed in a turbulent air mill, I have found that it is important to avoid subjecting the binder material to conditions which would cause the binder material to soften excessively or melt to an extent that an undesirably bonded mass would remit as will be understood. For instance, when using bicomponent binder fibers of cut length 32 mm with load-bearing fiber also of 32 mm, the material did seize up and would not produce fiberballs, especially with binder material of 110° C. melting point, and even with binder material melting at 160° C. So I cut the binder fibers to shorter lengths of 12 mm and 18 mm (corresponding to ½ inch and ¾ inch) cut length, which gave a satisfactory result. Accordingly, I prefer to use a blend of fibers in which binder fibers are shorter than the load-bearing fibers, preferably no more than 90%, and especially about 50%, of the length of the load-bearing fibers. Desirably, the binder fibers should not be shorter than about 10 mm.

In addition to using feed fiber of mixed length, it may be desirable to blend fiber of different denier per filament (dpf), bearing in mind the aesthetics desired, including insulating ability, and the fact that any binder material may change its configuration during bonding, and bearing in mind the need to process the blend of fibers and the consequent desirability of facilitating this, and reducing cost. Indeed, the ability to feed blends of fibers of differing dpf into the mill is an advantage of the process of the invention. In carding-type processes, blends of fibers of widely differing dpf may not be so easy to process into fiberballs, whereas I was successful in making lofty fiberballs from blends of fibers of 12 dpf with 4 dpf.

The resulting fiberballs according to the invention may be used as described in the aforementioned art. For molding fiberballs, dielectric (microwave) heating may be desirable alone or in conjunction with ovens, hot air or more conventional forms of heating, in which case it may be advantageous to use the techniques and materials disclosed by Kerawalla in U.S. Pat. No. 5,154,969.

What is claimed is:

1. A process for converting a cut fiber of synthetic melt-spun polymer, of cut length 12 to 80 mm, of 2 to 20 denier, and having a 3-dimensional crimp or 3-dimensional helical configuration, into fiberballs of randomly-entangled fibers, comprising feeding said cut fiber into a turbulent air mill that includes a cylindrical stator having an inner wall and cooperating with a rotor, rotatable relative to the stator and having a plurality of working plates that have their working surfaces facing the inner wall of the stator, and a gas transport facility having a central input port and a radially-located output port for gas and fiber, wherein the clearance between the working surfaces of the working plates and the inner wall of the stator is 4 to 10 mm.

2. A process according to claim 1, wherein cut fiber that has been slickened is fed into the mill.

3. A process according to claim 1, wherein cut fiber that has not been coated with a slickener is fed into the mill.

4. A process according to any one of claims 1 to 3, wherein a blend of cut fibers is fed into the mill 5. A process according to claim 4, wherein the blend is of fibers of differing denier per filament.

6. A process according to claim 4, wherein the blend is of binder fibers and of load-bearing fibers, said binder fibers being of cut length at least 10 mm and comprising binder material that melts at a temperature at least 5 degrees C lower than the temperature at which said load-bearing fibers soften, said load-bearing fibers being of cut length at least 20 mm.

7. A process according to claim 6, wherein the cut length of the binder fibers is no more than 90% of the cut length of the load-bearing fibers.

* * * * *